(12) United States Patent
Yin

(10) Patent No.: US 9,821,271 B2
(45) Date of Patent: Nov. 21, 2017

(54) GAS PURIFICATION AGENT AND METHOD OF USING THE SAME

(71) Applicant: Wuji Yin, Changsha (CN)

(72) Inventor: Wuji Yin, Changsha (CN)

( * ) Notice: Subject to any disclaimer, the term of this patent is extended or adjusted under 35 U.S.C. 154(b) by 63 days.

(21) Appl. No.: 14/768,079

(22) PCT Filed: Sep. 29, 2014

(86) PCT No.: PCT/CN2014/087834
§ 371 (c)(1),
(2) Date: Aug. 14, 2015

(87) PCT Pub. No.: WO2016/029529
PCT Pub. Date: Mar. 3, 2016

(65) Prior Publication Data
US 2016/0236143 A1 Aug. 18, 2016

(30) Foreign Application Priority Data

Aug. 28, 2014 (CN) .......................... 2014 1 0427094
Aug. 28, 2014 (CN) .......................... 2014 1 0427745

(51) Int. Cl.
| | | |
|---|---|---|
| *B01J 20/32* | (2006.01) | |
| *B01D 53/82* | (2006.01) | |
| *B01D 47/04* | (2006.01) | |
| *B01D 53/78* | (2006.01) | |
| *B01D 53/50* | (2006.01) | |
| *B01J 20/02* | (2006.01) | |
| *B01J 20/04* | (2006.01) | |
| *B01J 20/24* | (2006.01) | |
| *B01J 20/26* | (2006.01) | |
| *B01J 20/30* | (2006.01) | |
| *B01D 53/80* | (2006.01) | |

(52) U.S. Cl.
CPC ............. *B01D 53/82* (2013.01); *B01D 47/04* (2013.01); *B01D 53/502* (2013.01); *B01D 53/508* (2013.01); *B01D 53/78* (2013.01); *B01D 53/80* (2013.01); *B01J 20/02* (2013.01); *B01J 20/043* (2013.01); *B01J 20/24* (2013.01); *B01J 20/26* (2013.01); *B01J 20/3064* (2013.01); *B01D 2251/304* (2013.01); *B01D 2251/602* (2013.01); *B01D 2251/606* (2013.01); *B01D 2253/202* (2013.01)

(58) Field of Classification Search
CPC ....... B01J 20/32; B01J 20/26; B01J 20/28026
USPC .......................................................... 502/402
See application file for complete search history.

(56) References Cited

U.S. PATENT DOCUMENTS

| | | | |
|---|---|---|---|
| 2007/0166438 A1* | 7/2007 | Kitahata | ................ B01J 20/103 426/242 |
| 2009/0127499 A1 | 5/2009 | Tran et al. | |
| 2014/0186243 A1* | 7/2014 | Li | .......................... B01D 53/64 423/210 |
| 2016/0030914 A1* | 2/2016 | Boenkendorf | ..... B01J 20/28059 423/240 S |

FOREIGN PATENT DOCUMENTS

| | | |
|---|---|---|
| CN | 87101638 A | 1/1988 |
| CN | 1046437 A | 10/1990 |
| CN | 1077657 A | 10/1993 |
| CN | 1103605 A | 6/1995 |
| CN | 101497782 A | 5/2009 |
| CN | 101712861 A | 5/2010 |
| CN | 103184034 A | 7/2013 |
| CN | 103861404 A | 6/2014 |
| CN | 104147888 A | 11/2014 |
| CN | 104174278 A | 12/2014 |
| CN | 104258656 A | 1/2015 |

* cited by examiner

*Primary Examiner* — Edward Johnson
(74) *Attorney, Agent, or Firm* — Dilworth & Barrese, LLP

(57) ABSTRACT

A gas purification agent includes an electronegative film-forming agent and a foaming agent. The electronegative film-forming agent accounts for 20-80 wt % of the gas purification agent, while the foaming agent accounts for 20-80 wt % of the gas purification agent. The gas purification agent of such a composition can be used as a haze removing agent to effectively remove fine dust particles such as PM10 and PM2.5 from the air. The gas purification agent includes 2.5-25 wt % of the electronegative film-forming agent, 2.5-25 wt % of the foaming agent, and 50-95 wt % of a desulfurizing agent. The gas purification agent of such a composition can be used as a desulfurizing agent to remove sulfur-containing compounds from industrial exhaust gases. A method for using the gas purification agent is also provided.

19 Claims, No Drawings

GAS PURIFICATION AGENT AND METHOD OF USING THE SAME

FIELD OF THE INVENTION

The present disclosure relates to the technical field of environment protection, and in particular, to a method of using a gas purification agent, which is capable of desulfurization, and agglomeration of fine dusts such as PM10 and PM2.5.

BACKGROUND OF THE INVENTION

Currently, with the development of industrialized technologies, and improvement of people's living standard, atmospheric pollution caused by haze which substantially comprises electropositive fine dust particles of PM10 and PM2.5 and is generated in manufacture processes, daily life, and natural disasters, has become rather serious and severely affected people's health. In large and middle sized cities, enterprises using coal-fired industrial furnaces have to be moved out or closed down, and increasingly strict restrictions on vehicle emissions have been implemented. Nevertheless, increasingly severe haze pollution to the environment and the atmosphere is actually hard to effectively control. These electropositive fine dust particles of haze travel in the air for rather long time periods in very long distances and impose influences on a large scope of areas.

At present, universally accepted treatment methods include: 1) filtration method using air conditioners, humidifiers, cleaners, and the like in limited space; 2) absorption method using ultrasonic atomizers, water curtains, pools, fish tanks, and the like indoors; 3) plant absorption method using plant leaves; and 4) negative ion sedimentation using negative ion generators indoors. While these methods are effective in limited space, they seem to be powerless in solving fine dust and haze pollution to air. Technicians all over the world have been making unremitting efforts over a hundred years in solving the atmospheric haze pollution problem of electropositive fine dust particles.

With the methods for treating atmospheric haze in the prior art, it is still hard to solve the meteorological problem of frequently occurring of haze caused by high-content fine dust in the atmosphere of densely populated and economically developed regions in China, either at present or in the future. In addition, the world will also be confronted with the critical situation of PM2.5 pollution. Therefore, there is an urgent need for a brand new, simple, direct, and economic technical method to purify the atmosphere through removal of fine dust particles, i.e., PM10 and PM 2.5.

Moreover, the wet flue gas desulfurization technology is mostly used in industrial furnace flue gas desulfurization processes at home and abroad, in which an enormous wet desulfurization column system, and desulfurizing agents of limestone powder, lime, carbide slag, sodium carbonate are employed. Industrial furnace dry desulfurization technology is substantially used in certain special processes, such as a coal gas production line, in which desulfurizing powder comprising ferric oxide and ferrous oxide as main components is employed. These desulfurization technologies require huge investment and high operation costs. As a result, the government has to introduce encouraging policies and provide financial subsidies (e.g., price subsidies for thermal power desulfurization) to large enterprises. Numerous small coal-fired enterprises (e.g., brickyard, small arcola and metallurgy companies) which are largely distributed over the country, however, can hardly afford the investment that easily reaches hundreds of millions of RMB for flue gas desulfurization, and high operations costs required thereby. Lots of technicians have therefore constantly brought forth new ideas in flue gas desulfurization.

SUMMARY OF THE INVENTION

In order to solve the problem existing in the prior art, a gas purification agent is provided in the present disclosure, which is capable of desulfurization and agglomeration of fine dust such as PM10 and PM2.5. Hence, this purification agent can be used as an air haze-removing agent and a desulfurizing agent.

According to a first aspect of the present disclosure, it relates to a gas purification agent, comprising an electronegative film-forming agent and a foaming agent.

In one preferred embodiment of the present disclosure, the electronegative film-forming agent in the gas purification agent accounts for 20-80 wt %, preferably 28-40 wt % of the gas purification agent, while the foaming agent accounts for 20-80 wt %, preferably 60-72 wt % of the gas purification agent. The gas purification agent of such a composition can be used as a haze removing agent to effectively remove fine dust particles such as PM10 and PM2.5.

The above gas purification agent used as a haze removing agent can be additionally added with a compound generating no antagonism against electronegativity, adhesivity, and stability of water-soluble polymer vesicles, preferably selected from an essence and/or a pigment, an additive amount of which accounts for 0.1-5 wt % of a total amount of the film-forming agent and the foaming agent.

In one preferred embodiment of the present disclosure, the gas purification agent comprises 2.5-25 wt %, preferably 10-15 wt % of the electronegative film-forming agent, 2.5-25 wt %, preferably 10-15 wt % of the foaming agent, and 50-95 wt %, preferably 70-80 wt % of a desulfurizing agent. The gas purification agent of such a composition can be used as a desulfurizing agent to remove sulfur-containing compounds contained in industrial exhaust gases.

In one preferred embodiment of the present disclosure, the electronegative film-forming agent is a water-soluble polymer compound or complex that can form an electronegative water-soluble film, preferably being at least one substance selected from a group consisting of KEPS resin (produced by Daiichi Pharmaceutical Co., Ltd), 2-acrylamido-2-methylpropane sulfonates (AMPS) and homopolymers and copolymers thereof, anionic starch, vegetable gum, methylcellulose (MC), sodium carboxymethyl cellulose (CMC), hydroxyethyl cellulose (HEC), hydroxypropyl cellulose (HPC), hydroxyethyl methyl cellulose (HEMC), hydroxypropyl methyl cellulose (HPMC), hydroxybutyl methyl cellulose (NBMC), ethyl hydroxyethyl cellulose (EHEC), polyanionic cellulose (PAC), anionic polyacrylamide, polyacrylic acid, polymethacrylic acid and copolymer thereof, potassium polyacrylate, sodium polyacrylate, polyacrylates and copolymers thereof, xanthan gum (XG), sodium alginate, polyethylene glycol (PEG), polyethylene glycol esters (PVA), polyvinyl alcohol (PVA), polyoxyethylenes (PEO), polyvinyl pyrrolidones (PVP), N-vinylpyrrolidone (NVP), polymaleic anhydrides, maleic anhydride-acrylic acid copolymers (MBB), sodium polystyrenesulfonates, sulfonated styrene-maleic anhydride copolymers, water-soluble amino resins, polyepoxy succinates, and phosphine carboxylate.

In a further preferred embodiment of the present disclosure, the electronegative film-forming agent is at least one substance selected from a group consisting of KEPS resin, sodium carboxymethyl cellulose (CMC), hydroxyethyl methyl cellulose (HEMC), hydroxypropyl methyl cellulose (HPMC), anionic polyacrylamide, anionic starch, potassium polyacrylate, sodium alginate, polyvinyl alcohol, polyvinyl pyrrolidones, and polyethylene glycol.

In one preferred embodiment of the present disclosure, the foaming agent is at least one selected from a group consisting of anionic surfactants, amphoteric ionic surfactants, and nonionic surfactants, preferably at least one compound selected from a group consisting of sodium dodecyl sulfonate, sodium dodecyl benzene sulfonate, ethanolamine dodecanol sulfate (K12EA), sodium dodecyl sulfate (K12), F-873 foaming agent, fluorocarbon carboxylates, fluorocarbon sulphates, fluorocarbon sulfonates, sodium o-xylene alkyl sulfonate, sodium monolauryl phthalate (PAS12), sodium N-lauroyl-L-glutamate, potassium N-acyl glutamate (AGA salt), sodium isethionate, rosin soap (sodium abietate), rosin pyrolytic polymers, sodium secondary alkyl sulfates (SAS), ammonium fatty alcohol sulfates (NAS), sodium undecenyl monoethanolamidosulfosuccinate, sodium aliphatic alcohol sulfates (K14), monoethanolamine lauryl sulfate, diethanolamine lauryl sulfate, triethanolamine lauryl sulfate, sulfonated peregal, alkylphenol polyoxyethylene ethers (OP-1-18), potassium N-acyl glutamate, sodium oleic acid sarcosine, C12-C14 fatty alcohol polyoxyethylene ether carboxylates (AEC), ammonium C12 fatty alcohol polyoxyethylene ether sulfates (NAES), ammonium C12-C14 fatty alcohol sulfates (NAS), sodium alkoxy ethanolamidosuccinate monoester, lauryl dihydroxyethyl betaine, lauryl dimethyl betaine (BS-12), C16-C18 alkyl dihydroxyethyl betaines, N-coco-acyl glutamic acid monosodium salt (CGS-11), N-mixed fatty acyl glutamic acid monosodium salt (SGS-11), sodium N-lauroyl-L-aspartate (N-L-ASPS), sodium N-lauroyl-L-alanine (N-L-Alas), sodium hexadecanol monosuccinate sulfonate (MS 16), cocoyl diethanolamine oxide (GD-4501), cocamido propylamine oxide (CAO), polyoxyethylene lauryl ether o-phthalic acid monoester sodium salt (PAES), alkyl dimethyl amine oxides (OA), polyoxyethylene lauryl ether sulfosuccinate monoester disodium salts (SM series), fatty alcohol polyoxyethylene ether sulfosuccinate monoester ammonium salts (JHZ-120), sulfosuccinate 403, disodium monolauryl sulfosuccinate (succinate 201), polyoxyethylene fatty acid esters, fatty alcohol-polyoxyethylene ethers, polyoxyethylene lauryl ethers, sorbitan ester (Span) and polyoxyethylene ethers (Tween), copolymer polyethers of polyoxyethylene and polyoxypropylene, alkyl phenol polyoxyethylenes, alkyl polyoxyethylene ethers, alkylamine polyoxyethylene ethers, boric acid monoglyceride fatty acid ester, alkyl phosphates, and sodium pectate.

In a further preferred embodiment of the present disclosure, the foaming agent is at least one compound selected from a group consisting of sodium dodecyl benzene sulfonate, sodium dodecyl sulfate (K12), rosin soap (sodium abietate), rosin pyrolytic polymers, sodium aliphatic alcohol sulfates (K14), sulfosuccinate 403, polyoxyethylene lauryl ethers, and alkyl phenol polyoxyethylene ethers (OP-1-18).

In one preferred embodiment of the present disclosure, the desulfurizing agent is at least one substance selected from a group consisting of lime, carbide slag, stone powder, sodium carbonate, caustic soda, sodium metaaluminate, and sodium silicate.

The gas purification agent as a haze removing agent of the present disclosure mainly comprises the electronegative film-forming agent and the foaming agent, wherein the electronegative film-forming agent accounts for 20-80 wt %, preferably 28-40 wt % of the gas purification agent, while the foaming agent accounts for 20-80 wt %, preferably 60-72 wt % of the gas purification agent. The components can be homogenously mixed to form a powdery or pasty haze removing agent that removes haze by an electronegative membrane method. Alternatively, the components can be homogenously mixed with water to obtain the liquid state or pasty haze removing agent that removes haze by an electronegative membrane method. The components can also be separately packaged and proportionally mixed when being used to obtain the haze removing agent that removes by an electronegative membrane method.

According to a second aspect of the present disclosure, it relates to a method for using the gas purification agent as a haze removing agent, comprising the steps of: adding water into the above gas purification agent used as a haze removing agent under stirring to prepare an electronegative polymer foam liquid containing the gas purification agent at a concentration of 0.5-10 weight %; using a vesicle device to prepare vesicles with the foam liquid; and floating the vesicles in atmosphere containing haze.

The vesicles can be scattered from an aircraft in the air, or from the ground or high platforms with a vesicle anti-aircraft machine. Scattered vesicles float and move in the atmosphere containing haze.

When the gas purification agent as a haze removing agent of the present disclosure is used, the electronegative film-forming agent and the foaming agent interact with each other in a polyphase manner and are transformed into a large number of electronegative high-molecular polymer water-soluble membrane phase carriers, i.e., vesicles, which have superior mechanical strength and stability, and super large surface areas. The polymer vesicles float and move in the atmosphere aerosol containing haze (electropositive fine dust particles such as PM10 and PM2.5). On the one hand, the electronegative static electricity of the water-soluble vesicles can attract and aggregate electropositive fine dust particles such as PM10 and PM2.5 contained in the atmosphere. On the other hand, adhesivity of the high molecular polymer water-soluble membrane vesicles having super large surface areas can be used to absorb fine dust particles such as PM10 and PM2.5, and other floating contaminants such as fungal spores in the atmosphere. Meanwhile, the floating and moving high molecular polymer compound water-soluble membrane phase carriers, i.e., vesicles, solubilize, absorb, and aggregate gaseous organic contaminants contained in the atmosphere, so as to agglomerate the fine dust particles and contaminants that are contained in the atmosphere into thick particles loaded by the vesicles. Finally, the electronegative water-soluble membrane phase carriers, i.e., vesicles, floating and moving in the atmosphere agglomerate into thick particles, with aggregation of the fine dust particles, neutralization of charges, and dehumidification of the vesicles by the atmosphere, and then settle on the ground under action of gravity. This causes atmospheric contaminants to be transferred into the operation scope of microbial flora on the earth's surface and to be decomposed thereby. Thus, contaminants in the atmosphere such as fine dust particles which cause haze can be effectively removed therefrom.

According to a third aspect of the present disclosure, it relates to a method for using the gas purification agent as the desulfurizing agent, comprising the steps of: adding water into the gas purification agent used as the desulfurizing agent under stirring to prepare a foam liquid containing the gas purification agent at a concentration of 1-10 weight %;

using a vesicle device to prepare vesicles with the foam liquid; and floating and moving the vesicles in exhaust gases containing sulfur.

The adding amount of the gas purification agent as a desulfurizing agent or as a haze removing agent can be adjusted, for example, according to the concentration of $SO_2$, PM10, or PM2.5 in the exhaust gases released as tested on line. In a production line provided with a dust collector, the gas purification agent can be continuously added in a gas inlet pipe or a gas outlet pipe of the dust collector. In a small kiln furnace which is not provided with a dust collector, the gas purification agent can be continuously added in a flue gas discharging pipe thereof.

According to the gas purification agent as a desulfurizing agent of the present disclosure, the electronegative film-forming agent and the foaming agent (surfactant) can be used to load the desulfurizing agent in a distributed manner. For example, KEPS water-soluble resin at a concentration of 0.1% can adequately disperse the desulfurizing agent (e.g., lime and rock flour). The film-forming agent and the foaming agent at amounts exceeding threshold values required for distributed-loading the desulfurizing agent are used, to form water-soluble high molecular membrane phase carriers, i.e., vesicles. On the one hand, when being used, the electronegative film-forming agent and the foaming agent interact with each other to generate a large number of vesicles having superior machinery strength and stability as main carries of the desulfurizing agent, thus significantly enlarging the surface area of contact reactions between the desulfurizing agent and the flue gases. Meanwhile, a large number of tenacious electronegative vesicles disturb flow of flue gases, and largely improve contact time with the floating gases, so as to achieve an effective desulfurization rate as high as 99.99%. On the other hand, the large number of vesicles having super large surface areas in the flue gases attract electropositive fine dust particles aerosol (electropositive fine dust particles, PM10 and PM2.5) with the electronegative static electricity of the water-soluble membrane phase, and meanwhile agglomerate the electropositive fine dust particles (fine dust PM10 and PM2.5) with adhesivity of the water-soluble polymer vesicle phase having super large surfaces areas, so that the fine dust particles are agglomerated into thick particles loaded by the vesicles. In the flow of the flue gases, the vesicles are agglomerated into thick particles of large mass along with the formation and loading of sulfates, agglomeration of fine dust particles, neutralization of electoral properties, and dehumidification of water-soluble high molecular vesicles by the flue gases, so as to facilitate collection thereof by the dust collector, or settlement thereof in the flue gases or in the atmosphere (in small kiln furnaces where no dust collector is provided) under the action of gravity. Thus, atmospheric contaminants such as sulfur oxides and fine dust that are contained in the flue gases discharged from industrial kiln furnaces can be effectively removed.

The present disclosure can bring about following beneficial effects.

To start with, there are wide sources of raw materials for the gas purification agent used for removing haze of the present disclosure. The haze removing agent is easy to process, and the method for removing haze is easy to operate, and can be efficiently and economically used, thus providing a convenient and feasible technical means for removing contaminants from gases, especially from the ambient atmosphere.

Besides, the haze-removing agent of the present disclosure which removes haze by the membrane method and is formulated by the gas purification agent for removing haze and a pigment and/or an air freshener can generate vesicles floating in the air, which is splendid sight in the air and can bring about comfortableness and arouse passion in people who see the sight. And the sight is conflict-free with the environment and aircrafts in the air. Hence, the method of the present disclosure encourages people to co-work to remove atmosphere contaminants.

Moreover, the desulfurizing method with the gas purification agent for desulfurization is simple to operate and control at low costs due to high efficient desulfurization and dust aggregation, and therefore can be easily promoted.

In addition, the gas purification agent for desulfurization of the present disclosure can be excellently adapted to both flue gas desulfurization as well as removal of fine dust particles of PM10 and PM2.5 from desulfurized and purified flue gases that are discharged from large industrial kiln furnaces, i.e., secondary purification of exhaust gases, and flue gas desulfurization as well as removal of fine dust of PM2.5 from the flue gases discharged by a huge number of widely distributed small industrial kiln furnaces (including workshop-style kiln furnaces provided with no dust collector).

Furthermore, the gas purification agent of the present disclosure can be used to promote purification of atmospheric environment and removal of atmospheric haze, through a simple, convenient, and feasible technical means.

DETAILED DESCRIPTION OF THE EMBODIMENTS

The present disclosure will be explained in detail with reference to the examples, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the examples may be combined together in any manner, and the technical solutions obtained in this manner all fall within the scope of the present disclosure.

Example 1

The gas purification agent used to remove haze according to this example substantially comprised an electronegative film-forming agent and a foaming agent. KEPS resin 1205A and sodium carboxymethyl cellulose were selected as the electronegative film-forming agent, while sodium dodecyl sulfate, a rosin pyrolytic polymer, and alkyl phenol polyoxyethylene ether OP-2 were selected as the foaming agent. A mixture containing 29 weight % of the electronegative film-forming agent (10 weight % of KEPS resin 1205A, and 19 weight % of sodium carboxymethyl cellulose) and 71 weight % of the foaming agent (45 weight % of sodium dodecyl sulfate, 10 weight % of rosin pyrolytic polymer, and 16 weight % of OP-2) was formulated, which was added with water at twice the weight of the above mixture and homogeneously mixed to obtain a pasty gas purification agent.

The pasty gas purification agent obtained in this example was taken to an area of ravine landform for a test. This ravine landform area, concentrated with simple melting furnaces and coke furnaces, was embraced by mountains on three sides, and extended for about four kilometers from east to west, and about one kilometer from south to north. There were eight simple melting furnaces and two coke furnaces in this area. As measures for environment protection, only cyclone dust extractors were used. Hence, the atmosphere there had dense suspended dust all day long, and had a peculiar smell, which caused discomfort to persons living there. Tests showed a value of PM2.5 higher than 500. Electronegative foam water-soluble membrane phase carriers, i.e., vesicles were intended to be placed at two highlands located at two sides of this area for removal of dust haze.

The gas purification agent of this example was taken and added with water to prepare a foam liquid comprising 1 weight % of the gas purification agent. A vesicle device was used to prepare polymer vesicles, which were scattered into the atmosphere of the ravine area from two points at both a north side and a south side of this area. Floating and moving conditions of the vesicles in the entire region of the ravine area were visually observed. It was found that in the beginning, the floating vesicles settled rather fast. As the atmosphere in the ravine region became clearer, the settlement of the vesicles slowed down and there appeared a clear vesicle sight in the atmosphere. After about four hours, the vesicles in the atmosphere of the ravine area disappeared from view. As the air became transparent and the peculiar smell disappeared, the air turned fresh. The value of PM2.5 was tested to be reduced to 12. Vesicles that settled on the ground were examined and found all adhered with and wrapped up by agglomerated fine dust particles. Some of the vesicles were collected and blown with fans, and no dust phenomenon occurred.

In this example, in order to improve the ability of the water-soluble polymer membrane phase carriers in removing organic contaminants from the atmosphere, the KEPS resin having relatively low molecular weight, a large base number of negatively charged groups, high membrane strength, and superior tenacity was selected as the electronegative film-forming agent thereof, and was compounded with sodium carboxymethyl cellulose. The surfactant thereof was compounded with an alkyl phenol polyoxyethylene ether OP-2 of high lipophilicity, so as to enhance solubilizing, absorbing, and agglomerating abilities of the water-soluble membrane phase to organic contaminants. The test showed that the gas purification agent according to this example had good effects in gathering fine dust of PM10 and PM2.5 and organic contaminants in the atmosphere of the ravine area.

Example 2

The gas purification agent used to remove haze according to this example substantially comprised an electronegative film-forming agent and a foaming agent. Anionic polyacrylamide and sodium alginate were selected as the electronegative film-forming agent, while fatty alcohol sodium sulfate (K14), sulfosuccinate 403, and alkyl phenol polyoxyethylene ether OP-2 were selected as the foaming agent. A mixture containing 40 weight % of the electronegative film-forming agent (30 weight % of anionic polyacrylamide, and 10 weight % of sodium alginate) and 60 weight % of the foaming agent (40 weight % of fatty alcohol sodium sulfate, 10 weight % of sulfosuccinate 403, and 10 weight % of OP-2) was formulated, which was added with water at three times the weight of the above mixture and homogeneously mixed to obtain a pasty gas purification agent.

The gas purification agent obtained in this example was taken to a mountainous town for a test. This town was prosperous due to individual mining and smelting, but was subject to poor airflow. The atmosphere in this region was gray all the year round. Tests showed a value of PM2.5 higher than 500. Electronegative foam water-soluble membrane phase carriers, i.e., vesicles were intended to be placed at a highland in two sides of this town for removal of dust haze.

The gas purification agent of this example was taken and added with water to prepare a foam liquid comprising 0.8 weight % of the gas purification agent. A vesicle device was used to prepare polymer vesicles, which were scattered into the atmosphere of the town from both an east side and a west side thereof. Floating and moving conditions of the vesicles in the entire region of the town were visually observed. It was found that in the beginning, the floating vesicles settled rather fast. As the atmosphere in the region became clearer, the settlement of the vesicles slowed down and there appeared a clear vesicle sight in the atmosphere. After about five hours, the vesicles in the atmosphere of the entire town disappeared from view, and the air became transparent. The value of PM2.5 was tested to be reduced to 19. Vesicles that settled on the ground were examined and found all adhered with and wrapped up by agglomerated fine dust particles. Some of the vesicles were collected and blown with fans, and no dust phenomenon occurred.

In this example, in order to improve the ability of the water-soluble polymer membrane phase carriers in removing organic contaminants from the atmosphere, anionic polyacrylamide and sodium alginate having high membrane strength and superior tenacity was selected as the electronegative film-forming agent thereof. In addition, the surfactant thereof was compounded with OP-2 of high lipophilicity, so as to enhance solubilizing, absorbing, and agglomerating abilities of the water-soluble membrane phase to organic contaminants. The test showed that the gas purification agent according to this example had good effects in gathering fine dust of PM10 and PM2.5 and organic contaminants in the atmosphere of the town.

Example 3

In this example, polyvinyl pyrrolidone (PVP) and polyanionic cellulose were selected as the electronegative film-forming agent, while sodium dodecyl benzene sulfonate was selected as the foaming agent. A mixture containing 38 weight % of the electronegative film-forming agent (18 weight % of polyvinyl pyrrolidone (PVP), and 20 weight % of polyanionic cellulose), and 62 weight % of the foaming agent (62 weight % of sodium dodecyl benzene sulfonate) was formulated and mixed homogenously to obtain a powdery gas purification agent.

The powdery gas purification agent obtained in this example was taken to a mountainous county seat for a test. Due to a large number of coal mining and coking individual enterprises, the atmosphere in this region was gray all the year round, and had a peculiar smell. Tests showed a value of PM2.5 higher than 500. Electronegative water-soluble membrane phase carriers, i.e., vesicles were intended to be placed at the tops of three tall buildings in the county seat for removal of dust haze.

The gas purification agent of this example was taken and added with water to prepare a foam liquid comprising 2 weight % of the gas purification agent. A vesicle device was used to prepare polymer vesicles, which were scattered into the atmosphere from the tops of the tall buildings. Floating and moving conditions of the vesicles in the entire region of the county seat were visually observed. It was found that in the beginning, the floating vesicles settled rather fast. As the atmosphere in the region became clearer, the settlement of the vesicles slowed down and there appeared a clear vesicle sight in the atmosphere. After about five hours, the vesicles in the atmosphere of the region disappeared from view. The air became transparent and fresh. The value of PM2.5 was tested to be reduced to 10 at an average level. Vesicles that settled on the ground were examined and found all adhered with and wrapped up by agglomerated fine dust particles. Some of the vesicles were collected and blown with fans, and no dust phenomenon occurred. The test showed that the gas purification agent according to this example had good effects in gathering fine dust of PM10 and PM2.5 and organic contaminants in the atmosphere of the county seat.

Example 4

In this example, hydroxyethyl methyl cellulose and potassium polyacrylate were selected as the electronegative film-forming agent, while a polyoxyethylene lauryl ether, a rosin pyrolytic polymer, and alkyl phenol polyoxyethylene ether OP-3 were selected as the foaming agent. A mixture containing 71 weight % of the electronegative film-forming agent (40 weight % of hydroxyethyl methyl cellulose, and 31 weight % of potassium polyacrylate) and 29 weight % of the foaming agent (8 weight % of polyoxyethylene lauryl ether, 15 weight % of rosin pyrolytic polymer, and 6 weight % of OP-3) was formulated, which was added with a water-soluble pigment, coccinellin, accounting for 0.3 weight % of the total mass of the electronegative film-forming agent and the foaming agent, and water at twice the total weight of the above raw materials, and homogeneously mixed to obtain a pasty gas purification agent.

The gas purification agent obtained in this example was taken to the ravine area of Example 1 for a second test of haze removal.

The gas purification agent of this example was taken and added with water to prepare a foam liquid comprising 1 weight % of the gas purification agent. A vesicle device was arranged in a hot air balloon basket, and water-soluble vesicles were scattered into the atmosphere from 3,000 meters above the ground in the ravine area. Floating and moving conditions of the vesicles in the entire region of the ravine area were visually observed both in the air and on the ground. It was found that in the beginning, the floating vesicles settled rather fast. As the atmosphere in the ravine area became clearer, the vesicles were disturbed in the air, and it took on a bright, claret-colored vesicle sight. After about two hours, the air became transparent and fresh. The value of PM2.5 was tested to be 8. Vesicles that settled on the ground were examined and found all adhered with and wrapped up by agglomerated fine dust particles. Some of the vesicles were collected and blown with fans, and no dust phenomenon occurred.

In this example, in order to improve the ability of the water-soluble polymer membrane phase carriers in removing organic contaminants from the atmosphere, OP-3 of high lipophilicity was added in the surfactant thereof, so as to enhance solubilizing, absorbing, and agglomerating abilities of the water-soluble membrane phase to organic contaminants. The test showed that the gas purification agent according to this example had good effects in gathering fine dust of PM10 and PM2.5 and organic contaminants in the atmosphere of the ravine area.

Example 5

In this example, KEPS resin 1217A and polyethylene glycol were selected as the electronegative film-forming agent, while sodium dodecyl sulfate and rosin soap were selected as the foaming agent. A mixture containing 35 weight % of the electronegative film-forming agent (20 weight % of KEPS resin and 15 weight % of polyethylene glycol) and 65 weight % of the foaming agent (40 weight % of sodium dodecyl sulfate and 25 weight % of rosin soap) was formulated, which was added with lemon essence accounting for 0.15 weight % of the total mass of the electronegative film-forming agent and the foaming agent, and water at three times the mass of the above raw materials, and homogeneously mixed to obtain a pasty gas purification agent.

The gas purification agent obtained in this example was taken to the mountainous county seat of Example 3 for a second test of haze removal. Due to a large number of coal mining and coking individual enterprises around the county seat, the atmosphere in this region was gray all the year round, and had a peculiar smell. Tests showed a value of PM2.5 higher than 500.

The above haze removing agent that removes haze by the membrane method was taken and added with water to prepare a foam liquid comprising 5 weight % of the gas purification agent of this example. A vesicle device was arranged in a hot air balloon basket, and water-soluble vesicles were scattered into the atmosphere from 2,500 meters above the ground in the county seat. Floating and moving conditions of the vesicles in the entire region were visually observed both in the air and on the ground. It was found that in the beginning, the floating vesicles settled rather fast. As the atmosphere in the region became clearer, the vesicles were disturbed in the air, and it took on a clear vesicle sight. After about one hour, the air became transparent and fresh, and was filled with the fragrance of lemon. The value of PM2.5 was tested to be 8. Vesicles that settled on the ground were examined and found all adhered with and wrapped up by agglomerated fine dust particles. Some of the vesicles were collected and blown with fans, and no dust phenomenon occurred. The test showed that the gas purification agent according to this example had good effects in gathering fine dust of PM10 and PM2.5 and organic contaminants in the atmosphere of the county seat.

Example 6

The gas purification agent used as a desulfurizing agent according to this example substantially comprised an electronegative film-forming agent, a foaming agent, and a desulfurizing agent. KEPS resin 1205A and sodium carboxymethyl cellulose were selected as the electronegative film-forming agent; sodium dodecyl sulfate; rosin soap were selected as the foaming agent; and rock flour (the 80 μm screen residue of which is 12%) and sodium carbonate were selected as the desulfurizing agent. A mixture containing 3 weight % of the electronegative film-forming agent (1.5 weight % of KEPS resin 1205A, and 1.5 weight % of sodium carboxymethyl cellulose), 4 weight % of the foaming agent (3 weight % of sodium dodecyl sulfate and 1 weight % of rosin soap), and 93 weight % of the desulfurizing agent (50 weight % of rock flour and 43 weight % of sodium carbonate) was formulated and homogeneously mixed to obtain a powdery gas purification agent.

The above powdery gas purification agent was taken to a factory roasting stone coal and refining vanadium for a test. Previously, flue gases of a furnace for refining vanadium and roasting stone coal were fed through a cyclone dust extractor and then a bag collector before being released to the atmosphere. In this example, a feeding device was added in a blast pipe of the bag collector for tests.

The above powdery gas purification agent was added with water under stirring to prepare a foam liquid comprising 5 weight % of the gas purification agent of the present example. The foam liquid was then fed into the blast pipe of the bag collector with a vesicle device.

Before the gas purification agent was used, it was tested that the exhaust gases normally contained $SO_2$ at a concentration of 2,800 mg/$Nm^3$ and PM2.5 at a concentration of 3,700 mg/$Nm^3$, and formed an airflow of visible light gray.

During the test, a vesicle device was used to prepare the foam liquid of the present example into vesicles, which were then added into the blast pipe of the bag collector. In a stable state achieved after adjustment, exhaust gases were tested to contain $SO_2$ at a concentration of 8 mg/$Nm^3$ and PM2.5 at a concentration of 7 mg/$Nm^3$, and formed an airflow completely transparent and colorless. The test showed that the gas purification agent according to this example had good effects in removing $SO_2$ and gathering fine dust of PM2.5 from the exhaust gases of this dust removal system.

Example 7

In this example, anionic polyacrylamide and hydroxyethyl cellulose were selected as the electronegative film-forming agent; sodium dodecyl benzene sulfonate and rosin soap were selected as the foaming agent; and lime were selected as the desulfurizing agent. A mixture containing 10 weight % of the electronegative film-forming agent (5 weight % of anionic polyacrylamide, and 5 weight % of sodium hydroxyethyl cellulose), 10 weight % of the foaming agent (6 weight % of sodium dodecyl benzene sulfonate and 4 weight % of rosin soap), and 80 weight % of the desulfurizing agent was formulated and homogeneously mixed to obtain a powdery gas purification agent.

The above powdery gas purification agent was taken to a new dry process cement plant for a test. Previously, the kiln tail exhaust gases of this plant were fed through an electric precipitator before being released to the atmosphere. In this example, a feeding device was added in a blast pipe of the electric precipitator for tests.

The above powdery gas purification agent was added with water under stirring to prepare a foam liquid comprising 7 weight % of the gas purification agent of the present example.

Before the gas purification agent of the present example was used, it was tested that the exhaust gases released from the kiln tail normally contained $SO_2$ at a concentration of 780 mg/$Nm^3$ and PM2.5 at a concentration of 3,200 mg/$Nm^3$, and formed an airflow presenting visible light yellow.

A vesicle device was used to prepare the foam liquid of the present example into vesicles, which were then added into the blast pipe of the electric precipitator. In a stable state achieved after adjustment, the exhaust gases released were tested to contain $SO_2$ at a concentration of 3 mg/$Nm^3$ and PM2.5 at a concentration of 10 mg/$Nm^3$, and formed an airflow completely transparent and colorless. The test showed that the gas purification agent according to this example had good effects in removing $SO_2$ and gathering fine dust of PM2.5 from the exhaust gases of this dust removal system.

Example 8

In this example, KEPS resin 1205A and polyvinyl alcohol were selected as the electronegative film-forming agent; foam powder F-973 and fatty alcohol polyoxyethylene ether sulfosuccinate monoester ammonium salt (JHZ-120) were selected as the foaming agent; and sodium metaaluminate were selected as the desulfurizing agent. A mixture containing 20 weight % of the electronegative film-forming agent (8 weight % of KEPS resin and 12 weight % of polyvinyl alcohol), 22 weight % of the foaming agent (12 weight % of F-873 and 10 weight % of JHZ-120), and 58 weight % of the desulfurizing agent was formulated, added with water at twice the mass of the mixture, and homogeneously mixed to obtain a pasty gas purification agent.

The above gas purification agent was taken to a stone coal power plant for a test. Previously, the flue gases of this stone coal power plant were subsequently fed through a dust precipitator for dust collection and a desulfurizing tower for desulfurization before being released to the atmosphere. In the present example, a feeding device was added in a discharge pipe after the desulfurizing tower for tests.

The above gas purification agent was added with water under stirring to prepare a foam liquid comprising 2.5 weight % of the gas purification agent of the present example when being used.

Before the gas purification agent was used, it was tested that the exhaust gases released normally contained $SO_2$ at a concentration of 280 mg/$Nm^3$ and PM2.5 at a concentration of 980 mg/$Nm^3$, and formed an airflow presenting visible light gray.

A vesicle device was used to prepare the foam liquid of the present example into vesicles, which were then added into the discharge pipe after the desulfurizing tower. In a stable state achieved after adjustment, the exhaust gases released were tested to contain $SO_2$ at a concentration of 6 mg/$Nm^3$ and PM2.5 at a concentration of 7 mg/$Nm^3$, and formed an airflow presenting the color white. The test showed that the gas purification agent according to this example had good effects in removing $SO_2$ and gathering fine dust of PM2.5 from the exhaust gases of this dust removal system.

Example 9

In this example, sodium alginate and anionic starch were selected as the electronegative film-forming agent; sodium dodecyl benzene sulfonate and hexadecanol mono succinate sodium sulfonate were selected as the foaming agent; and carbide slag were selected as the desulfurizing agent. 6 weight % of the electronegative film-forming agent (2 weight % of sodium alginate, and 4 weight % of anionic starch), 6 weight % of the foaming agent (3 weight % of sodium dodecyl benzene sulfonate and 3 weight % of hexadecanol mono succinate sodium sulfonate), and 88 weight % of the desulfurizing agent carbide slag were separately taken and packaged to obtain a gas purification agent.

The above gas purification agent with its components separately packaged was taken to a 24-brick-kiln red brick plant for a test. Previously, this plant was not provided with any dust collector, and exhaust gases from the brick kiln were directly released to the atmosphere through a flue pipe. In the present example, a feeding device was added in a vertical discharge pipe for tests.

The separately packaged components of the above gas purification agent were placed in a bucket, in which water was added under stirring to prepare a foam liquid comprising 2 weight % of the gas purification agent of the present example.

Before the gas purification agent of the present example was used, it was tested that the exhaust gases released normally contained $SO_2$ at a concentration of 2,700 mg/$Nm^3$ and PM2.5 at a concentration of 4,800 mg/$Nm^3$, and formed an airflow presenting visible light yellow and having a sharp smell.

During the test, a vesicle device was used to prepare the foam liquid into vesicles, which were then continuously added into the discharge pipe. In a stable state achieved after adjustment, the exhaust gases released were tested to contain $SO_2$ at a concentration of 43 mg/$Nm^3$ and PM2.5 at a concentration of 28 mg/$Nm^3$, and formed an airflow presenting the color white without a sharp smell. The test showed that the gas purification agent according to this example had good effects in removing $SO_2$ and gathering fine dust of PM2.5 from the exhaust gases released from the flue pipe of the brick kiln.

Example 10

In this example, cooked rubber powder, potassium polyacrylate, and sodium carboxymethyl cellulose were selected as the electronegative film-forming agent; sodium dodecyl sulfate and rosin soap were selected as the foaming agent; and sodium carbonate was selected as the desulfurizing agent. A mixture containing 13 weight % of the electronegative film-forming agent (5 weight % of cooked rubber powder, 5 weight % of potassium polyacrylate, and 3 weight % of sodium carboxymethyl cellulose), 7 weight % of the foaming agent (3 weight % of sodium dodecyl sulfate and 4 weight % of rosin soap), and 80 weight % of the desulfurizing agent sodium carbonate was formulated, added with water at three times the weight of the mixture, and homogeneously mixed to obtain a gas purification agent in the form of a pasty film.

The above gas purification agent was taken to a lime factory for a test. Previously, this factory was not provided with any dust collector, and exhaust gases were directly released to the atmosphere through a flue pipe. In the present example, a feeding device was added in a discharge pipe of a lime kiln for tests.

The above gas purification agent was added with water under stirring to prepare a foam liquid comprising 1.5 weight % of the gas purification agent.

Before the gas purification agent of the present example was used, it was tested that the exhaust gases released normally contained $SO_2$ at a concentration of 1,800 mg/$Nm^3$ and PM2.5 at a concentration of 4,300 mg/$Nm^3$, and formed an airflow presenting gray without a sharp smell.

During the test, a vesicle device was used to prepare the foam liquid of the present example into vesicles, which were then added from blow the flue gas discharge pipe of the lime kiln. In a stable state achieved after adjustment, the exhaust gases released were tested to contain $SO_2$ at a concentration of 29 mg/$Nm^3$ and PM2.5 at a concentration of 31 mg/$Nm^3$, and formed an airflow presenting the color white without a sharp smell. The test showed that the gas purification agent according to this example had good effects in removing $SO_2$ and gathering fine dust of PM2.5 from the flue gases of the lime kiln.

The invention claimed is:

1. A gas purification agent, comprising an electronegative film-forming agent and a foaming agent forming either a powdery or liquid pasty haze-removing agent with the interacting electronegative film-forming agent and foaming agent transformed into a large number of electronegative high-molecular polymer water-soluble membrane phase carriers or vesicles.

2. The gas purification agent according to claim 1, wherein the electronegative film-forming agent accounts for 20-80 wt %, while the foaming agent accounts for 20-80 wt % of the gas purification agent.

3. The gas purification agent according to claim 2, further comprising a compound generating no antagonism against electronegativity, adhesivity, and stability of water-soluble polymer vesicles.

4. The gas purification agent according to claim 1, comprising 2.5-25 wt % of the electronegative film-forming agent, 2.5-25 wt % of the foaming agent, and 50-95 wt % of a desulfurizing agent.

5. The gas purification agent according to claim 1, wherein the electronegative film-forming agent is in the form of a water-soluble polymer compound or complex that can form an electronegative water-soluble film.

6. The gas purification agent according to claim 1, wherein the electronegative film-forming agent is selected from the group consisting of KEPS resin, sodium carboxymethyl cellulose, hydroxyethyl methyl cellulose, hydroxypropyl methyl cellulose, anionic polyacrylamide, anionic starch, potassium polyacrylate, sodium alginate, polyvinyl alcohol, polyvinyl pyrrolidone, and polyethylene glycol and mixtures thereof.

7. The gas purification agent according to claim 1, wherein the foaming agent is selected from the group consisting of anionic surfactants, amphoteric ionic surfactants, and nonionic surfactants and mixtures thereof.

8. The gas purification agent according to claim 1, wherein the foaming agent is selected from the group consisting of sodium dodecyl benzene sulfonate, sodium dodecyl sulfate, rosin soap, rosin pyrolytic polymers, sodium aliphatic alcohol sulfates, sulfosuccinate 403, polyoxyethylene lauryl ethers, and alkyl phenol polyoxyethylene ethers and mixtures thereof.

9. The gas purification agent according to claim 4, wherein the desulfurizing agent is selected from the group consisting of lime, carbide slag, stone powder, sodium carbonate, caustic soda, sodium metaaluminate, and sodium silicate and mixtures thereof.

10. A method for using the gas purification agent according to claim 2, comprising the steps of: adding water into the gas purification agent under stirring to prepare an electronegative polymer foam liquid containing the gas purification agent at a concentration of 0.5-10 weight %, using a vesicle device to prepare vesicles with the foam liquid, and floating the vesicles in atmosphere containing haze.

11. A method for using the gas purification agent according to claim 4, comprising the steps of: adding water into the gas purification agent under stirring to prepare a foam liquid containing the gas purification agent at a concentration of 1-10 weight %, using a vesicle device to prepare vesicles with the foam liquid, and floating and moving the vesicles in exhaust gases containing sulfur.

12. The gas purification agent according to claim 2, wherein the electronegative film-forming agent accounts for 28-40 wt % of the gas purification agent, while the foaming agent accounts for 60-72 wt % of the gas purification agent.

13. The gas purification agent according to claim 3, wherein the compound is selected from the group consisting of an essence, a pigment and mixtures thereof, an additive amount of which accounts for 0.1-5 wt % of a total amount of the film-forming agent and the foaming agent.

14. The gas purification agent according to claim 4, comprising 10-15 wt % of the electronegative film-forming agent, 10-15 wt % of the foaming agent, and 70-80 wt % of the desulfurizing agent.

15. The gas purification agent according to claim 5, wherein the electronegative film-forming agent is selected from the group consisting of KEPS resin, 2-acrylamido-2-methylpropane sulfonates and homopolymers and copolymers thereof, anionic starch, vegetable gum, methylcellulose, sodium carboxymethyl cellulose, hydroxyethyl cellulose, hydroxypropyl cellulose, hydroxyethyl methyl cellulose, hydroxypropyl methyl cellulose, hydroxybutyl methyl cellulose, ethyl hydroxyethyl cellulose, polyanionic cellulose, anionic polyacrylamide, polyacrylic acid, polymethacrylic acid and copolymer thereof, potassium polyacrylate, sodium polyacrylate, polyacrylates and copolymers thereof, xanthan gum, sodium alginate, polyethylene glycol, polyethylene glycol esters, polyvinyl alcohol, polyoxyethylene, polyvinyl pyrrolidone, N-vinylpyrrolidone, polymaleic anhydride, of maleic anhydride-acrylic acid copolymers, sodium polystyrenesulfonate, sulfonated styrene-maleic anhydride copolymers, water-soluble amino resin, polyepoxy succinate, and phosphine carboxylate and mixtures thereof.

16. The gas purification agent according to claim 7, wherein the foaming agent is selected from the group consisting of sodium dodecyl sulfonate, sodium dodecyl benzene sulfonate, ethanolamine dodecanol sulfate, sodium dodecyl sulfate, F-873 foaming agent, fluorocarbon carboxylates, fluorocarbon sulphates, fluorocarbon sulfonates, sodium o-xylene alkyl sulfonate, sodium monolauryl phthalate, sodium N-lauroyl-L-glutamate, potassium N-acyl glutamate, sodium isethionate, rosin soap, rosin pyrolytic polymers, sodium secondary alkyl sulfates, ammonium fatty alcohol sulfates, sodium undecenyl monoethanolamidosulfosuccinate, sodium aliphatic alcohol sulfates, monoethanolamine lauryl sulfate, diethanolamine lauryl sulfate, triethanolamine lauryl sulfate, sulfonated peregal, alkylphenol polyoxyethylene ethers, potassium N-acyl glutamate, sodium oleic acid sarcosine, C12-C14 fatty alcohol polyoxyethylene ether carboxylates, ammonium C12 fatty alcohol polyoxyethylene ether sulfates, ammonium C12-C14 fatty alcohol sulfates, sodium alkoxy ethanolamidosuccinate monoester, lauryl dihydroxyethyl betaine, lauryl dimethyl betaine, C16-C18 alkyl dihydroxyethyl betaines, N-cocoacyl glutamic acid monosodium salt, N-mixed fatty acyl glutamic acid monosodium salt, sodium N-lauroyl-L-aspartate, sodium N-lauroyl-L-alanine, sodium hexadecanol monosuccinate sulfonate, cocoyl diethanolamine oxide, cocamido propylamine oxide, polyoxyethylene lauryl ether o-phthalic acid mono-ester sodium salt, alkyl dimethyl amine oxides, polyoxyethylene lauryl ether sulfosuccinate monoester disodium salts, fatty alcohol polyoxyethylene ether sulfosuccinate monoester ammonium salts, sulfosuccinate 403, disodium monolauryl sulfosuccinate, polyoxyethylene fatty acid esters, fatty alcohol-polyoxyethylene ethers, polyoxyethylene lauryl ethers, sorbitan ester polyoxyethylene ethers, copolymer polyethers of polyoxyethylene and polyoxypropylene, alkyl phenol polyoxyethylene ethers, alkyl polyoxyethylene ethers, alkylamine polyoxyethylene ethers, boric acid monoglyceride fatty acid ester, alkyl phosphates, and sodium pectate and mixtures thereof.

17. The gas purification agent according to claim 1, wherein the electronegative film-forming agent and a foaming agent are homogeneously mixed together.

18. The gas purification agent according to claim 1, wherein
the electronegative film-forming agent is KEPS resin 1205A and sodium carboxymethyl cellulose and the foaming agent is sodium dodecyl sulfate, rosin pyrolytic polymer and alkyl phenol polyoxyethylene ether OP2, or
the electronegative film-forming agent is anionic polyacrylamide and sodium alginate and the foaming agent is fatty alcohol sodium sulfate (K14), sulfosuccinate 403 and alkyl phenol polyoxyethylene ether OP2, or
the electronegative film-forming agent is polyvinyl pyrrolidone and polyanionic cellulose and the foaming agent is sodium dodecyl benzene sulfonate, or
the electronegative film-forming agent is hydroxyethyl methyl cellulose and potassium polyacrylate and the foaming agent is polyoxyethylene lauryl ether, rosin pyrolytic polymer and alkyl phenol polyoxyethylene ether OP3, or
the electronegative film-forming agent is KEPS resin 1217A and polyethylene glycol and the foaming agent is sodium dodecyl sulfate and rosin soap.

19. The gas purification agent according to claim 4, wherein
the electronegative film-forming agent is KEPS resin 1205A and sodium carboxymethyl cellulose and the foaming agent is sodium dodecyl sulfate and rosin soap and the desulfurizing agent is rock flour and sodium carbonate, or
the electronegative film-forming agent is anionic polyacrylamide and hydroxyethyl cellulose, the foaming agent is sodium dodecyl benzene sulfonate and rosin soap and the desulfurizing agent is lime, or
the electronegative film-forming agent is KEPS resin 1205A and polyvinyl alcohol, the foaming agent is foam powder F-973 and fatty alcohol polyoxyethylene ether sulfosuccinate monoester ammonium salt and the desulfurizing agent is sodium meta-aluminate, or
the electronegative film-forming agent is sodium alginate and anionic starch, the foaming agent is sodium dodecyl benzene sulfonate and hexadecanol mono succinate sodium sulfonate and the desulfurizing agent is carbide slag, or
the electronegative film-forming agent is rubber powder, potassium polyacrylate and sodium carboxymethyl cellulose, the foaming agent is sodium dodecyl sulfate and rosin soap and the desulfurizing agent is sodium carbonate.

\* \* \* \* \*